United States Patent [19]

Geissler

[11] Patent Number: 5,782,586
[45] Date of Patent: Jul. 21, 1998

[54] SPINDLE UNIT FOR MACHINE TOOLS

[75] Inventor: Alfred Geissler, Pfronten, Germany

[73] Assignee: Deckel Maho GmbH, Pfonten, Germany

[21] Appl. No.: 770,959

[22] Filed: Dec. 20, 1996

[30] Foreign Application Priority Data

Dec. 22, 1995 [DE] Germany ............ 295 20 427 U

[51] Int. Cl.⁶ .................................................. B23B 51/06
[52] U.S. Cl. ............... 408/56; 408/57; 409/136; 409/231; 409/233
[58] Field of Search ................... 409/233, 231, 409/136; 408/56, 57

[56] References Cited

U.S. PATENT DOCUMENTS

| | | | |
|---|---|---|---|
| 4,863,324 | 9/1989 | Blessing | 409/233 |
| 4,915,553 | 4/1990 | Lazarevic | 409/233 |
| 4,951,578 | 8/1990 | Von Haas et al. | 408/56 |
| 4,957,398 | 9/1990 | Schneider et al. | 409/233 |
| 5,009,554 | 4/1991 | Kameyama et al. | 409/231 |
| 5,096,347 | 3/1992 | Kumagai et al. | 409/233 |
| 5,420,388 | 5/1995 | Girardin | 219/69.15 |

FOREIGN PATENT DOCUMENTS

| | | |
|---|---|---|
| 3706534 | 4/1988 | Germany. |
| 60-034244 | 2/1985 | Japan. |

*Primary Examiner*—Daniel W. Howell
*Assistant Examiner*—Adesh Bhargava
*Attorney, Agent, or Firm*—Baker & Maxham

[57] ABSTRACT

A spindle unit for machine tools, with a working spindle that is provided to accommodate a tool and is mounted so it can rotate in a housing and is driven by a motor, and with a chucking unit with an operating device and an internal coolant supply to the tool. A short and compact spindle unit is created according to this invention by the fact that the internal coolant supply is integrated into the chucking unit and has a rotary transmission lead-through mounted inside the operating device to convey the coolant from a stationary supply line into the chucking unit.

13 Claims, 2 Drawing Sheets

SPINDLE UNIT FOR MACHINE TOOLS

BACKGROUND OF THE INVENTION

1. Field of the Invention

The invention generally concerns machine tools, and more particularly relates to a spindle unit for machine tools having an internal coolant supply to the tool integrated into the chucking unit.

2. Description of the Related Art

With traditional spindle units having an internal coolant supply, the components to supply the coolant from stationary pipelines into the parts of the chucking unit that rotate in machining are arranged as a separate unit connected to the operating device. This causes the entire spindle unit to have a considerable structural length, which causes restrictions in the working space of the machine tool, especially with a spindle unit that can be pivoted.

SUMMARY OF THE INVENTION

A primary purpose of this invention is to create a short and compact spindle unit with an internal coolant supply. This purpose is achieved according to this invention due to the fact that the internal coolant supply is integrated into the chucking unit and has a rotary transmission lead-through in the operating device. Because the coolant supply is integrated into the chucking unit, an extremely compact design of the operating mechanism and the rotary transmission lead-through is achieved, so the structural length of the spindle unit is not increased. Therefore, such a spindle unit is also especially suitable for use as a swiveling spindle because the space required for swiveling in the working space of the machine tool is normally limited.

An expedient embodiment of this invention is characterized in that the operating mechanism is designed as a cylinder/piston unit with a ring piston arranged in an annular space between one part of the housing and a cylindrical inside part. The rotary transmission lead-piston. Therefore, both the operating mechanism as well as the rotary lead-through are arranged in an especially space-saving manner.

For a sealed transfer of cooling liquid from the stationary feed line to the parts of the chucking unit that rotate in machining, the rotary lead-through preferably has a connection to the rotating parts and a sleeve that is pressed tightly by the coolant pressure against the connections opening into the feed line. Preferably a face seal ring and a packing ring made of a wear-resistant material are provided on the adjacent faces of the sleeve and the connection.

The coolant pressure acts on the rear face of the sleeve facing the feed line when machining with an internal supply of coolant, pressing the sleeve against the connection. This yields an advantageous seal between the sleeve and the connection. In machining without a coolant, no pressure acts on the rear face of the sleeve so it is pressed away from the connection by a spring when no coolant pressure acts on the sleeve in an appropriate embodiment. As a result, the rings of the axial face seal provided on the adjacent faces of the connection and the sleeve rub against each other only when an internal coolant supply is needed and therefore a sealing connection is required. This prevents excessive wear between the two rings.

The force is transmitted from the piston to the tie rod of the chucking unit in an advantageous manner via an axially displaceable thrust ring to which cylinder pins that act on the chucking unit are attached. The cylinder pins are guided in the corresponding boreholes in an intermediate bushing that is screwed into the rear end of the working spindle.

An especially compact design of the spindle unit is achieved by the fact that it is designed as a motor-driven spindle. The spindle is surrounded concentrically by the motor whose rotor is rotationally connected to the working spindle.

BRIEF DESCRIPTION OF THE DRAWING

The objects, advantages and features of the invention will be more readily understood from the following detailed description, when read in conjunction with the accompanying drawing, wherein.

DETAILED DESCRIPTION OF THE PREFERRED EMBODIMENTS

In both figures, the chucking unit integrated into the spindle unit is shown in the released position in the left half of the figure and in the chucked position in the right half of the figure.

Figure 1:
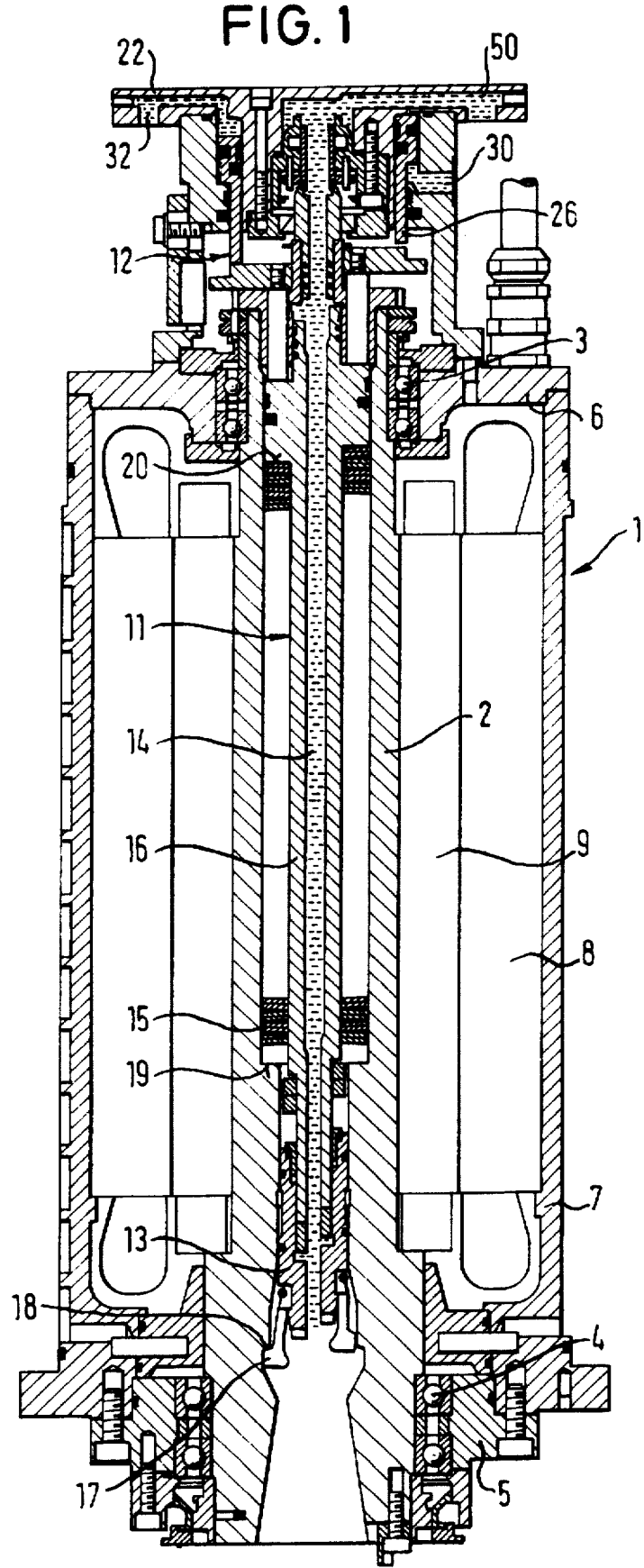
FIG. 1 is a longitudinal section through a preferred embodiment of a spindle unit constructed according to this invention.

Spindle unit 1 illustrated in FIG. 1 is part of a universal machine tool and includes working spindle 2 that is designed as a hollow shaft and is mounted so it can rotate in two bearing caps 5, 6 of spindle housing 7 by means of bearing arrangement 3, 4. Working spindle 2 is driven by drive motor 8 that is mounted in spindle housing 7 between bearing caps 5, 6 and whose rotor 9 surrounds the working spindle concentrically and is rotationally connected to it.

Spindle unit 1 contains chucking unit 11 with operating mechanism 12. Chucking unit 11 includes hollow work-holding bushing 13 that is mounted on the front end of tie rod 16 that is provided with through hole 14 and is pre-stressed by disk spring package 15. Grippers 17 that can pivot laterally are provided on the front end of work-holding bushing 13 and are pressed inward in the chucked position by projection 18 on the inside wall of working spindle 2 to engage in a matching groove in a tool or a tool receptacle. Disk spring package 15 is supported on one side on ring shoulder 19 in the working spindle and on the other side on a collar 20 on the rear area of tie rod 16.

Figure 2:
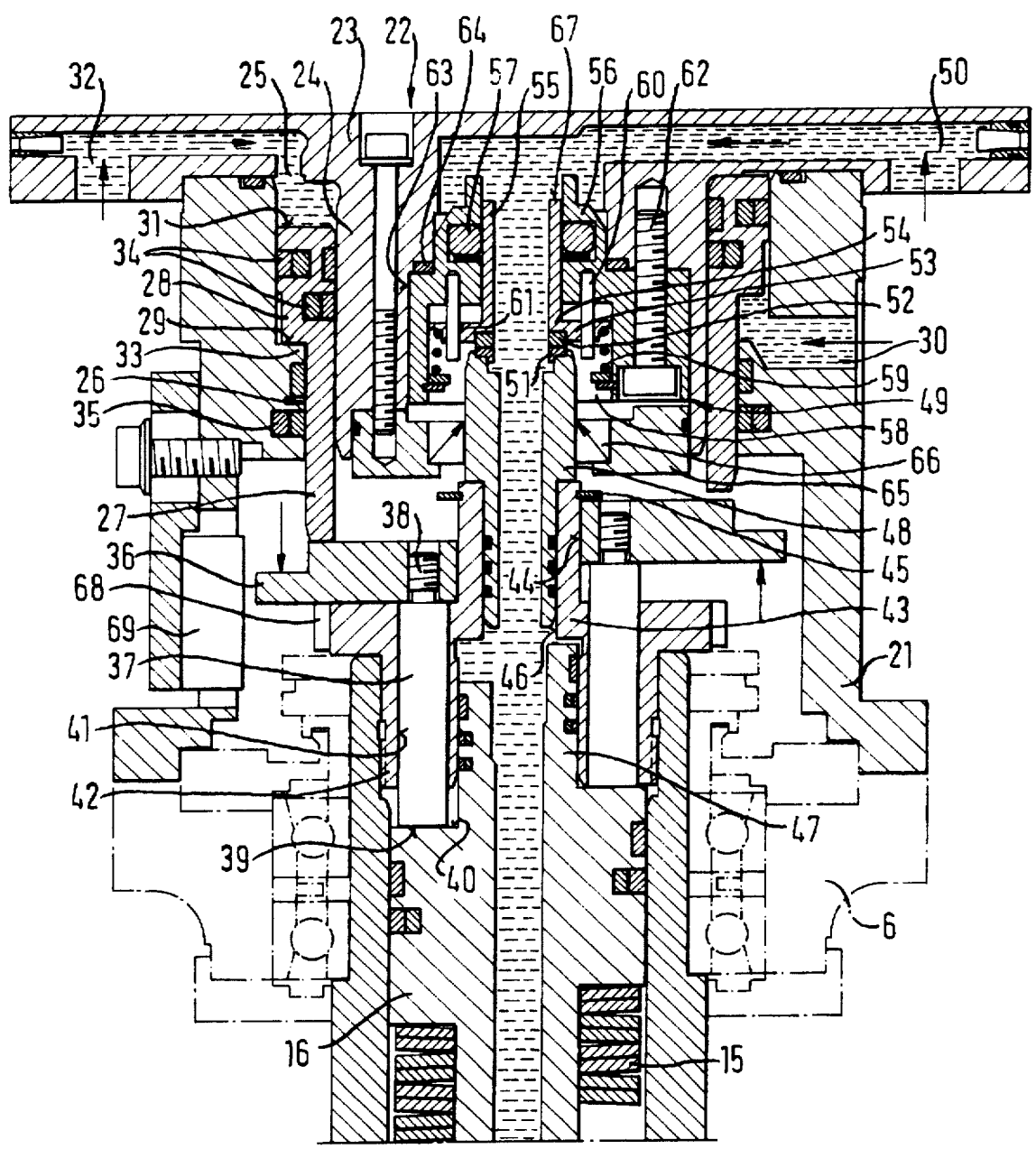
FIG. 2 is an enlarged sectional diagram of the operating mechanism of FIG. 1 for the chucking unit with an integrated coolant supply.

As shown especially in FIG. 2, operating device 12 is designed as a hydraulic cylinder-piston unit that is accommodated in housing part 21 mounted on rear bearing cap 6. The end of housing part 21 that is open to the rear is closed by sealing cap 22 that has connecting flange 23 which is in contact with the rear face of housing part 21 and has cylindrical inside part 24 that projects into housing part 21. The cylindrical surface of cylindrical inside part 24 borders with the inside wall of housing part 21 annular space 25 in which cylindrical piston 26 is mounted so it can be displaced axially. Piston 26 has front area 27 that faces working spindle 2 and has a smaller outside diameter plus rear area 28 that has a larger outside diameter. Annular end face 29 at the transition between these areas serves as a piston face for pressure acting on piston 26 in the direction of insertion. Housing part 21 has fluid channel 30 leading to annular end face 29. Rear end face 31 of area 28 forms the piston face for pressure to act on the piston in the direction of extraction. Fluid channel 32 in connecting flange 23 leads to end face 31. The inside wall of housing part 21 has ring shoulder 33 against which ring-shaped end face 29 comes to rest in the completely extracted position of piston 26. In rear area 28 of piston 26 there are sealing elements 34 to seal piston 26 with respect to housing part 21 and cylindrical inside part 24. Gasket 35 provided in housing part 21 rests against the outside of front area 27 of piston 26.

When extracted, piston 26 presses against axially displaceable thrust ring 36 to which are attached cylinder pins 37 that act on tie rod 16. Cylinder pins 37 are screwed into matching threaded boreholes in thrust ring 36 by threaded pins 38 on the rear and their front faces 39 are in contact with rear ring collar 40 on tie rod 16. On the outside circumference, cylinder pins 37 are inserted into boreholes 41 in intermediate bushing 42 that is in turn screwed into the rear end of working spindle 2. Thrust ring 36 with its inside bore 44 is guided axially on rear cylinder shoulder 43 of intermediate bushing 42 and is axially secured by a spring ring arranged on the end of cylinder shoulder 43. Intermediate bushing 42 has stepped through-hole 46 in whose front area, which has a larger inside diameter, cylindrical end piece 47 of tie rod 16 is guided axially so it provides a seal. Hollow connection 48 of rotary transmission lead-through 49 is pressed into the rear area of through-hole 46 with the smaller inside diameter.

Rotary transmission lead-through 49 serves to conduct a coolant under pressure from stationary supply line 50 into chucking unit 11 which rotates when machining with working spindle 2 and allows the coolant to flow to a coolant channel running through the tool. Supply line 50 for the coolant is also arranged in connecting flange 23 and leads to an inlet to rotary transmission lead-through 49.

To supply coolant in a sealed system, rotary transmission lead-through 49 has packing ring 51 that is secured on the rear face of connection 48 and is in contact with face seal ring 52 on the front face of enlarged disk-shaped part 53 of axially movable sleeve 54. Packing ring 51 and face seal ring 52 are preferably made of ceramics. Sleeve 54 with its rear cylindrical part 55 is guided axially in a matching borehole in receptacle bushing 56 and sealed by ring gasket 57. Part 53 which is enlarged in the form of a disk of sleeve 54 is accommodated in enlarged section 58 and is acted on by spring 59 in the direction of separating the face seal ring and the packing ring. To center sleeve 54 and prevent it from turning, centering pins 60 are secured in receptacle bushing 56 on which disk-shaped enlarged part 53 is guided displaceably through appropriate boreholes 61.

Receptacle bushing 56 is mounted by screws 62 in matching recess 63 and is sealed by ring gasket 64 on the inside of sealing cover 22. Sealing ring 65 with gasket 66 is provided on the face of sealing cover 22 facing working spindle 2.

The coolant is introduced into spindle unit 1 through supply line 50 and enters the inlet of rotary transmission lead-through 49. The coolant pressure acts on rear face 67 of sleeve 54 and thus presses face seal ring 52 on the front end of sleeve 54 against packing ring 51. This yields a tight connection between sleeve 54 which is prevented from turning and connection 48 of rotary transmission lead-through 49 which rotates with working spindle 2 in machining. Coolant enters hollow tie rod 16 through hollow connection 48 and the through-hole inside of intermediate bushing 42 and goes from there to the tool through work-holding bushing 13. If no coolant is supplied, no coolant pressure acts on rear face 67 of sleeve 54, so the sleeve is moved away from connection 48 by spring 59, and face seal ring 52 is moved away from packing ring 51. The result is that the packing ring and the face seal ring rub against each other only when an internal coolant supply is needed and therefore a sealed connection is required. This minimizes the wear on the face seal ring and the packing ring.

External teeth 68 are provided on the outside circumference of intermediate bushing 42, so a rotary transducer engages with these teeth to detect the position of the working spindle. Furthermore, position switch 69 for detecting the position of the tool clamping device is provided on the outside of housing part 21 so it faces the cylindrical surface of thrust ring 36.

To release the tool, piston 26 is acted on by a hydraulic fluid through fluid channel 32, causing it to move out of the chucked position illustrated in the right half of FIG. 2 into the released position illustrated in the left half of the figures. Piston 26 pushes tie rod 16 forward over thrust ring 36 and cylinder pins 37, in other words, it pushes down in FIG. 2, thus compressing disk spring package 15. Thus the work-holding bushing 13 is moved downward, and grippers 17 enter an enlarged area where they are spread outwardly over the springs and release the tool.

To chuck the tool, fluid channel 30 is put under pressure, where piston 26 moves out of the released position into the chucked position and tie rod 16 with work-holding bushing 13 is pulled into working spindle 2 under the influence of disk spring package 15. Grippers 17 are also pressed inward and engage in the ring groove on a tool (not shown) inserted into working spindle 2. Piston 26 travels inward to the extent that its front face is a distance away from thrust ring 36 in the chucked position. This prevents the thrust ring, which rotates together with working spindle 2 in machining, from rubbing against piston 26 and thus causing wear.

In view of the above description, it is likely that modifications and improvements will occur to those skilled in this technical field which are within the scope of the invention. Accordingly, this invention is to be limited only by the spirit and scope of the appended claims and equivalents thereto.

What is claimed is:

1. A spindle unit for machine tools comprising:
   a housing;
   a motor in said housing;
   a working spindle mounted for rotation in said housing, said working spindle being driven by said motor to accommodate a tool;
   a chucking unit with an operating mechanism in said housing and coupled to said working spindle; and
   supply channels in said spindle unit for providing internal coolant to the tool;
   wherein said internal coolant channels are integrated into said chucking unit and have a rotary transmission lead-through arranged inside said operating mechanism to convey the coolant from a stationary supply channel into said chucking unit.

2. The spindle unit recited in claim 1, wherein said operating mechanism is configured as a cylinder-piston unit with a cylindrical piston arranged in an annular space between a housing part and a cylindrical inside part, where said rotary transmission lead-through is build into said cylindrical inside part.

3. The spindle unit recited in claim 1 or 2, wherein said rotary transmission lead-through has a connection and a sleeve that is pressed by coolant pressure against said connection so it is sealed.

4. The spindle unit recited in claim 3, wherein said sleeve has a cylindrical part that opens into said supply channel and whose end face is acted on by the coolant pressure.

5. The spindle unit recited in claim 3, wherein a wear-resistant face seal ring and packing ring are provided on the adjacent faces of said sleeve and said connection, respectively.

6. The spindle unit recited in claim 4, wherein a wear-resistant face seal ring and packing ring are provided on the adjacent faces of said sleeve and said connection, respectively.

7. The spindle unit recited in claim 3, wherein a spring for pushing said sleeve away from said connection is provided on said sleeve.

8. The spindle unit recited in claim 4, wherein a spring for pushing said sleeve away from said connection is provided on said sleeve.

9. The spindle unit recited in claim 3, wherein said connection is inserted with a seal into a hollow intermediate bushing that is screwed into the rear end of said working spindle.

10. The spindle unit recited in claim 2, wherein said piston acts on a tie rod of said chucking unit via a thrust ring that is provided with cylinder pins.

11. The spindle unit recited in claim 10, wherein said cylinder pins are guided so they can move axially in matching boreholes in an intermediate bushing.

12. The spindle unit recited in claim 10, wherein said thrust ring is guided axially with its inside bore on a rear cylindrical shoulder on an intermediate bushing and is secured axially by a spring ring.

13. The spindle unit recited in claim 1, wherein said motor surrounds said working spindle concentrically and its rotor is connected to said working spindle in a rotationally rigid mount.

* * * * *